United States Patent [19]
Todo

[11] Patent Number: 4,461,033
[45] Date of Patent: Jul. 17, 1984

[54] TRANSCEIVER

[75] Inventor: Akira Todo, Kasukabe, Japan

[73] Assignee: Sony Corporation, Tokyo, Japan

[21] Appl. No.: 434,552

[22] Filed: Oct. 15, 1982

[30] Foreign Application Priority Data

Oct. 20, 1981 [JP] Japan .......................... 56-155895[U]

[51] Int. Cl.³ .............................................. H04B 1/38
[52] U.S. Cl. ................... 455/78; 179/2 EA; 179/167; 200/5 B; 200/50 C; 200/61.58 R
[58] Field of Search ............................ 455/73, 78, 83; 179/2 EA, 81 B, 100 L, 167; 200/5 B, 5 D, 18, 50 C, 61.58 R

[56] References Cited

U.S. PATENT DOCUMENTS 2,425,495 8/1947 Trevor et al. ..................... 455/83

Primary Examiner—Marc E. Bookbinder
Attorney, Agent, or Firm—Lewis H. Eslinger; Alvin Sinderbrand

[57] ABSTRACT

A transceiver having transmitting, receiving, and standby modes of operation includes in a first embodiment, a first push button actuable for selectively establishing the receiving and transmitting modes and a rotatable element positionable to select the standby or receiving modes or the inoperative state of the transceiver. An interlocking mechanism interconnects the first push button with the rotatable element. In another embodiment, a second push button, rather than the rotatable element, is depressible for establishing the standby mode. In each case, the transceiver can be changed over from the standby to the transmitting or receiving mode by depressing the first push-button, or by depressing and then releasing the first push button, respectively.

16 Claims, 8 Drawing Figures

TRANSCEIVER

BACKGROUND OF THE INVENTION

1. Field of the Invention

The present invention relates to a transceiver and more particularly is directed to an improved mode selecting apparatus for a transceiver.

2. Description of the Prior Art

Previously proposed transceivers have been provided with a standby mode of operation in which an oscillating sound is generated upon reception of a signal to inform a transceiver operator of such reception. Such standby mode advantageously consumes less power than the receiving mode. Thus while awaiting reception of a signal, it is desirable to maintain the transceiver in the standby rather than receiving mode of operation. However, in changing the transceiver from the standby mode to either the transmitting or receiving mode, the transceiver operator must, in independent steps, first switch the standby mode off and then establish the transmitting or receiving mode. These required independent steps make the change-over or switching operation inconvenient and require an undesirable length of time to accomplish, so that a loss of received information can result from the lapse of time required in switching from the standby mode to the receiving mode of operation.

OBJECTS AND SUMMARY OF THE INVENTION

Accordingly, it is an object of the present invention to provide a transceiver which has transmitting, receiving, and standby modes of operation and avoids the foregoing disadvantages of the prior art.

More specifically, it is an object of the present invention to provide a new and improved transceiver which requires less time to switch from the standby mode of operation to the transmitting or receiving mode of operation.

It is another object of the present invention to provide a transceiver which can be changed-over from the standby mode of operation to the receiving mode of operation in a single rapidly performed step so that substantially all of the received signal can be picked up by the transceiver.

A further object of the present invention is to provide a transceiver, as aforesaid, which can be conveniently changed-over from its standby mode to either its receiving or transmitting mode by actuation of a single push-button.

In accordance with an aspect of this invention, a transceiver comprises apparatus for selectively establishing the transmitting, receiving and standby modes of operation including means actuable to establish the standby mode and change-over means effective, when depressed, to change the transceiver from the standby mode to the transmitting mode and, when depressed and then released, to change the transceiver from the standby mode to the receiving mode of operation.

The above, and other objects, features and advantages of the invention, will be apparent from the following detailed description which is to be read in conjunction with the accompanying drawings.

DETAILED DESCRIPTION OF THE PREFERRED EMBODIMENTS

Figure 1:
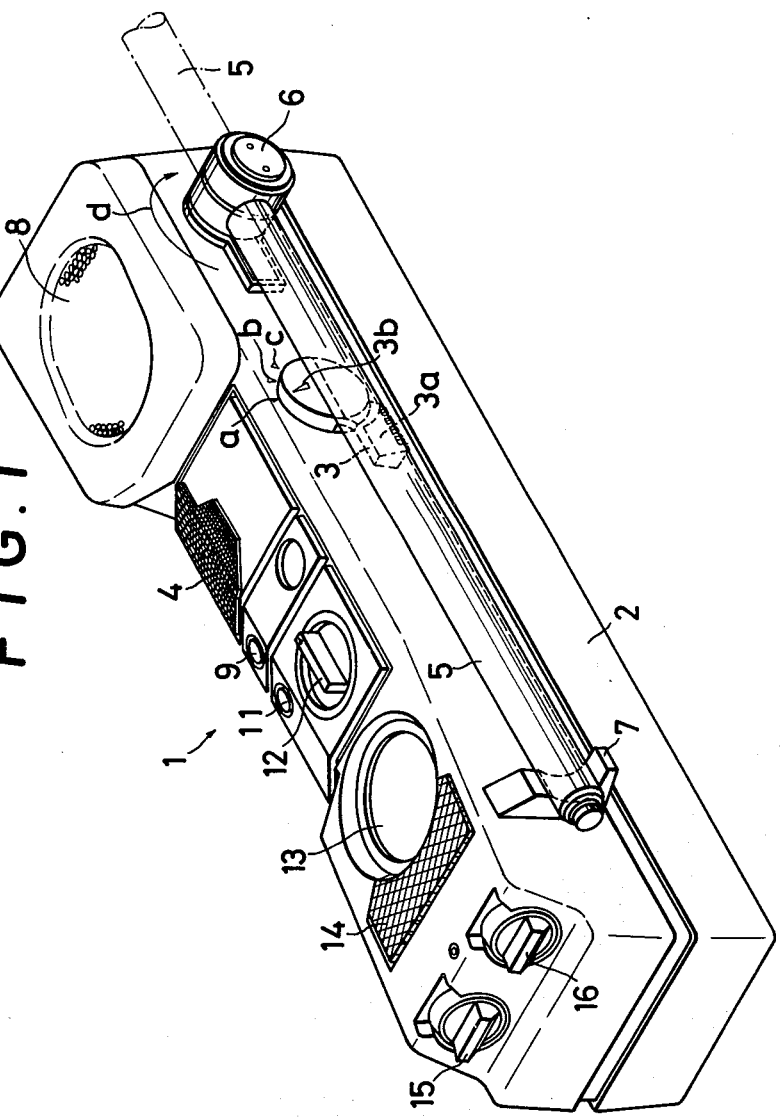
FIG. 1 is a perspective view of a transceiver in accordance with an embodiment of the present invention.

As shown in FIG. 1, a transceiver 1 according to this invention has a housing or cabinet 2 which, at one side thereof, has a lever 3 rotatably mounted for turning ON or OFF a power source (not shown) or selecting a stand-by mode of operation. Lever 3 includes a portion 3a having an inclined surface and an index 3b which when aligned with a mark a on the body of cabinet 2, indicates that the power source is OFF, and is hereinafter referred to as the OFF position of lever 3. When index 3b is in alignment with a mark b on cabinet 2, such alignment indicates that the power source is ON, and is hereinafter referred to as the ON position, of lever 3. Finally, when index 3b is in alignment with a mark c on cabinet 2, such alignment indicates that the transceiver is in its standby mode of operation, and is hereinafter referred to as the standby position. A push-button or talk button 4 is arranged on the top surface of cabinet 2. When lever 3 is disposed in its ON position, the transceiver is rendered operative in a receiving mode. With lever 3 remaining in its ON position, depression of talk button 4 establishes a transmission mode.

For operation in either the transmitting or receiving mode, a rod antenna 5 is pivoted about a pin 6 in the direction of arrow d from a stored-position shown in full lines on FIG. 1 to an extended operative position, as indicated by a broken line. In particular, unless rod antenna 5 is pivoted away from its stored position in the direction indicated by arrow d and extended, lever 3 cannot be manipulated to its ON or stand-by position due to antenna 5 blocking access to lever 3. Furthermore, if lever 3 is in the ON or standby position and rod antenna 5 is brought from its operative position for transmitting and receiving to the stored position in which antenna 5 is disposed on an antenna rest 7, lever 3 will be pivoted to its OFF position by the action of antenna 5 against the inclined surface of portion 3a. Thus, by placing antenna 5 in its rest or stored position, the transceiver power source is turned OFF whether or not the transceiver is in its standby, transmitting or receiving mode of operation.

Additional elements of the transceiver 1 shown on FIG. 1 include a speaker 8, a scan button 9 associated with a scanning circuit for detecting and locking into transmitted signals picked up by the transceiver, a frequency display window 10, an additional button, such as a manual button 11, a channel selector knob 12, a meter 13 to indicate the signal level or the state of a battery or other power source, a microphone 14, a squelch knob 15, and a volume knob 16.

Figure 2:
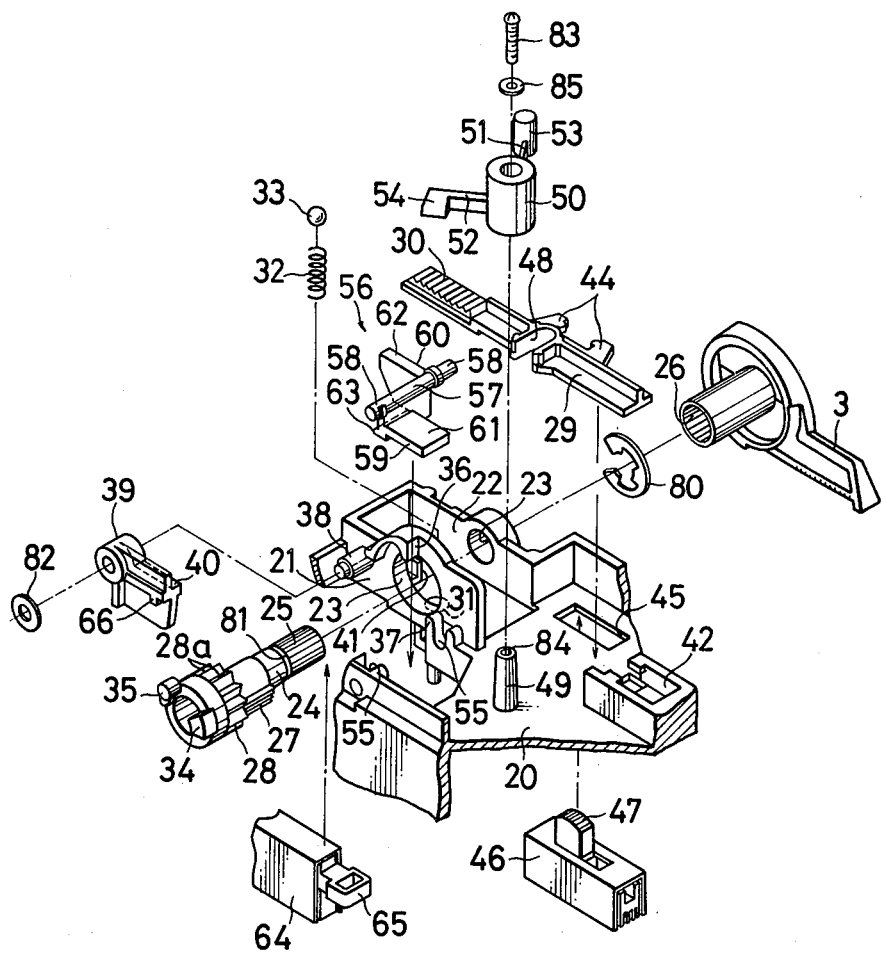
FIG. 2 is an exploded perspective view illustrating elements included in a control assembly of the transceiver shown in FIG. 1.

As shown in FIG. 2, within cabinet 2 is a chassis 20 which is integral therewith and is made of synthetic resin or other similar material. A pair of support plates or flanges 21 and 22, which form part of chassis 20, are formed with a pair of shaft holes 23 that oppose each other. A pivot shaft 24 is pivotally supported by and extends through shaft holes 23. A serrated end portion 25 of pivot shaft 24 is inserted into a boss hole 26 of lever 3 for rotatable coupling therewith.

A pinion gear portion 27 is formed around half of the outer circumferential surface of a mid-portion of pivot shaft 24 considered in the axial direction thereof. Detent teeth 28 are formed around shaft 24 adjacent to pinion gear portion 27. A slide member 29 is interposed between flanges 21 and 22 and is slidable in a front-to-back direction on chassis 20. A rack portion 30 is formed on slide member 29 along the direction of its sliding movement. Rack portion 30 engages pinion gear portion 27 of pivot shaft 24. A ball hole 31 is formed in chassis 20 below detent teeth 28. A detent ball 33, which is biased upward by a compression spring 32, is arranged inside ball hole 31. Detent ball 33 engages detent teeth 28 stepwise such that a clicking sound is made when pivot shaft 24 is pivoted by lever 3. Each adjacent pair of bottom lands 28a of detent teeth 28 have a 30° angular interval therebetween. Pivotal movement of lever 3 through 30° will turn lever 3 from the OFF position to the ON position, and further pivotal movement of 30° will turn lever 3 to the standby position.

Figure 5:
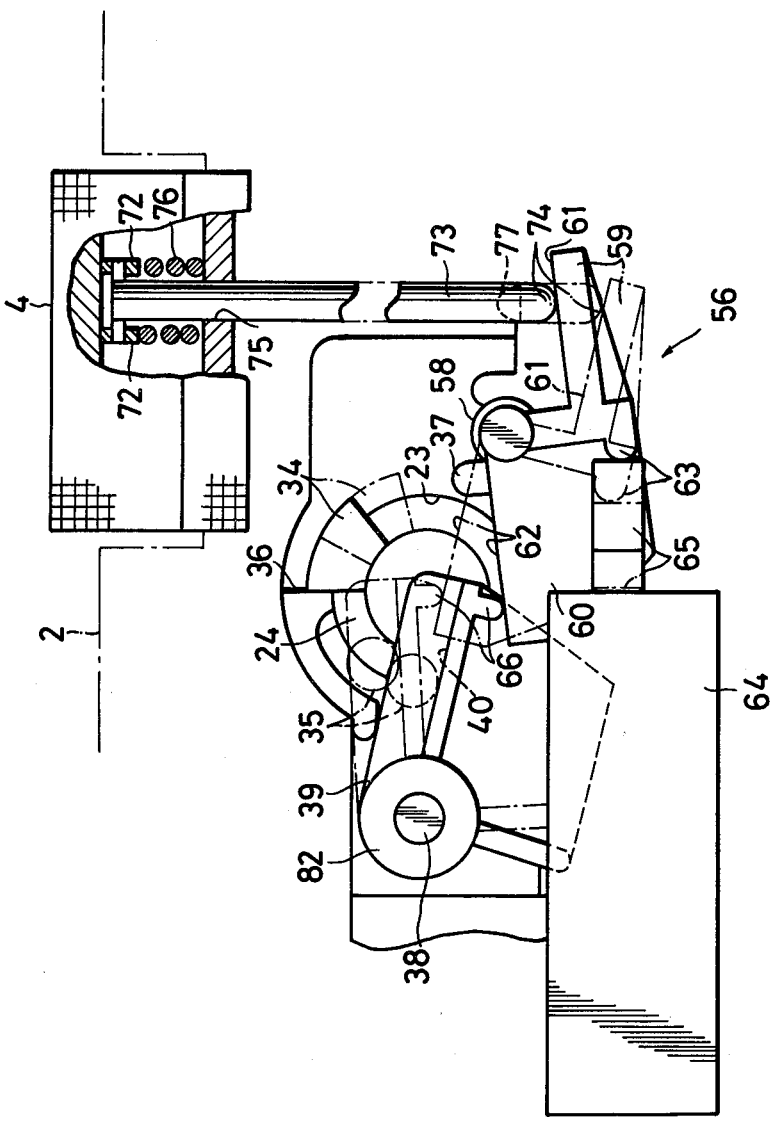
FIG. 5 is a side elevational view of the control assembly of FIGS. 3 and 4.

At the end of pivot shaft 24 remote from lever 3 and which is adjacent to support flange 21, there is a sectorial shaped portion 34 and a columnar shaped portion 35. Two stoppers 36 and 37 are formed on the outer side surface of support flange 21 and are located at opposite sides of the respective shaft hole 23. Stoppers 36 and 37 are arranged with a predetermined angular distance therebetween to determine the range of pivotal movement of lever 3. When lever 3 is pivoted to the OFF position, sectorial shaped portion 34 contacts stopper 37 and switch lever 3 is pivoted to the standby position, sectorial shaped portion 34 contacts stopper 36. A support shaft 38 is also formed on the outer side surface of support flange 21 and a first interlocking member 39 is pivotally supported thereon. First interlocking member 39 is formed with an urging portion 40 which, when first interlocking member 39 pivots counterclockwise, as shown in FIG. 5, acts upwardly against columnar portion 35 to pivot shaft 24 in the clockwise direction.

Figure 3:
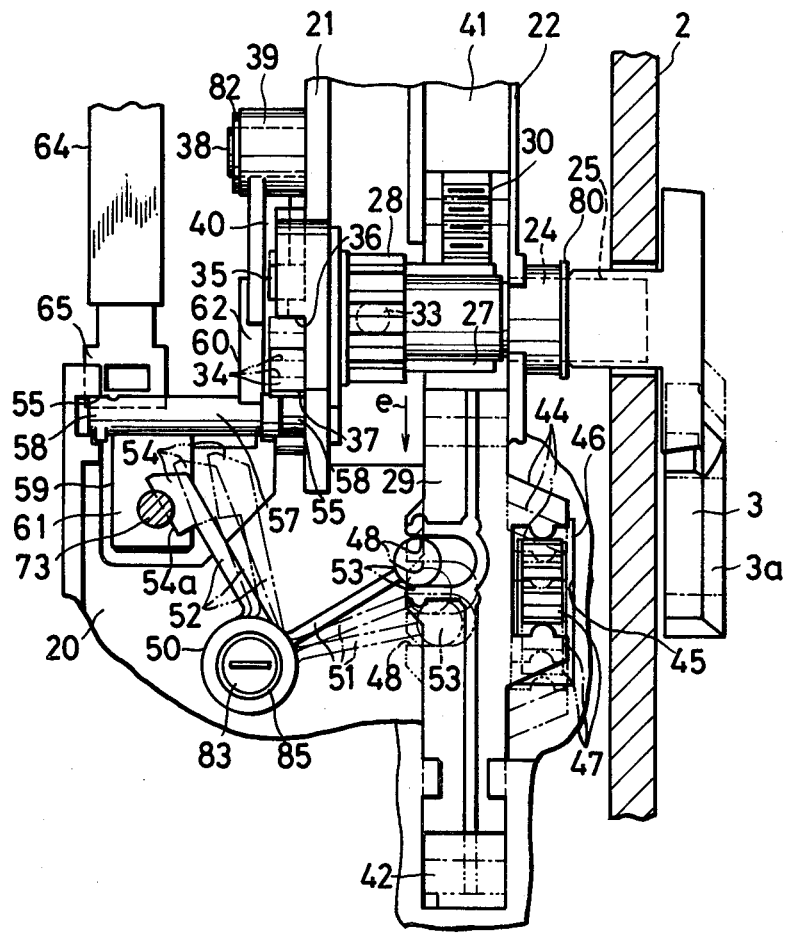
FIG. 3 is a plan view of the control assembly comprised of the elements shown in FIG. 2.
Figure 4:
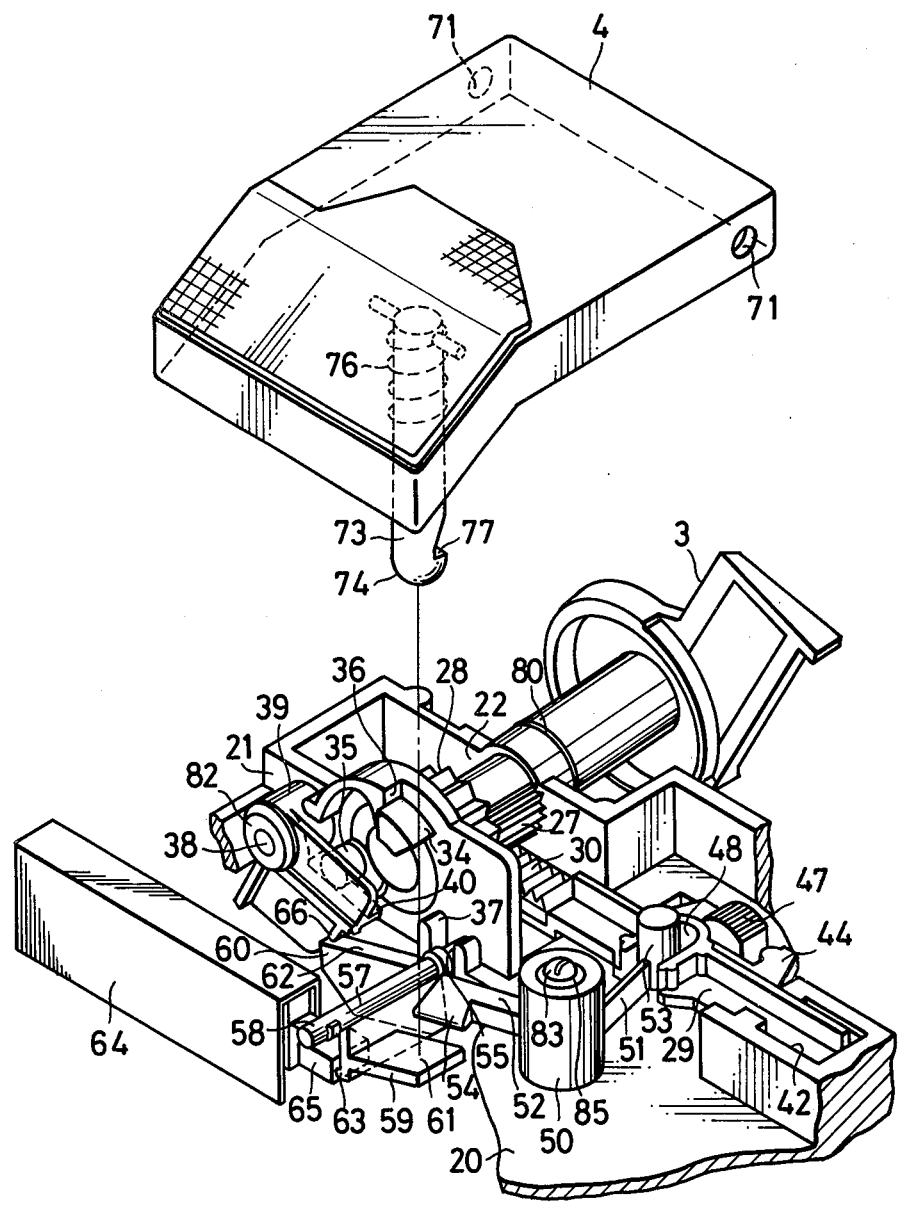
FIG. 4 is a perspective view of the control assembly of in FIG. 3 shown conditioned for the stand-by mode of operation and further illustrating a push-button actuable for selecting the receiving or transmitting mode.

Referring now to FIG. 3, it will be seen that front and back ends of slide member 29 are slidably inserted into a pair of guide portions 41 and 42 which are integral with chassis 20. As shown in FIGS. 2 to 4, a pair of spaced apart engaging pawls 44 are located along a side of slide member 29. A rectangularly shaped opening 45 is formed in chassis 20 adjacent to that side of slide member 29. An actuating arm 47 of a three-position slide-type switch 46 projects upwardly through opening 45 and is received between the pair of engaging pawls 44. When actuating arm 47 is in a position indicated by the solid line in FIG. 3, which corresponds to the OFF position of lever 3, switch 46 establishes the OFF condition of the transceiver. When actuating arm 47 is in a position indicated by the single dot-dash line, and which corresponds to the ON position of lever 3, switch 46 is in its ON state. Finally, when arm 47 is in a position indicated by the double dots-dash line, which corresponds to the standby position of switch lever 3, switch 46 establishes the standby mode of operation.

Slide member 29 also has an engaging, U-shaped recess 48. A support shaft 49 (FIG. 2) projects upward from chassis 20 near one side of slide member 29. A pivot member 50 is pivotally supported by support shaft 49. Pivot member 50 is made of synthetic resin or other suitable material and has two arms 51 and 52 which extend substantially perpendicularly to each other and are sufficiently thin so as to be suitably elastic. An engaging columnar shaped portion 53 is provided at the distal end of arm 51 and engages in recess 48 of slide member 29. A locking, wedge-shaped portion 54 having an inclined surface 54a is formed at the distal end of arm 52 and is adapted for locking or latching engagement with an actuating rod 73 of talk button 4 to be described below.

A pair of upwardly opening U-shaped bearings 55 are formed on chassis 20 in front of support shaft 49. Ends 58 of a shaft portion 57 of a second interlocking member 56 are pivotally supported in bearings 55. As shown in FIG. 2, second interlocking member 56 has a first L-shaped arm plate 59 and a second substantially flat arm plate 60 at respective ends of shaft portion 57. An end portion 61 of arm plate 59 extends under the lower end of actuating rod 73, and an urging portion 62 is formed at the distal end of second arm plate 60. A switch operating projection 63 is formed at the bend portion of L-shaped arm plate 59. A transmission/reception switch 64 is mounted on a printed circuit board (not shown) in cabinet 2. When a reciprocally movable switch actuating rod 65 is urged into the body of transmission/reception switch 64, the transmission mode is established. When rod 65 is released so as to be returned to its original or projecting position by a biasing force of a spring disposed within the switch body, the receiving mode is established. Due to the biasing force of the spring in the body of switch 64, the distal end of rod 65 is normally in contact with switch operating projection 63 of second interlocking member 56. A depending projection 66 is formed on first interlocking member 39 so that when second interlocking member 56 pivots in the clockwise direction, as viewed on FIG. 5, urging portion 62 urges projection 66 to pivot first interlocking member 39 in the counterclockwise direction. As seen in FIG. 4, talk button 4 is of substantially rectangular shape and has a front portion bent slightly downwardly. A pair of support shafts (not shown) fixed to cabinet 2 are inserted into a pair of shaft holes 71 located in opposite sides of talk button 4 for pivotally supporting the latter. As shown in FIG. 5, a pair of brackets 72 are formed on the under surface of talk button 4. The upper end of actuating rod 73 is pivotally coupled to brackets 72. Actuating rod 73 extends into cabinet 2 through an insertion hole 75 formed in the top of the cabinet. The lower end 74 of rod 73 is in contact from above with portion 61 of second interlocking member 56. A compression spring 76 is mounted around that portion of rod 73 which is interposed between the under surface of talk button 4 and the top surface of cabinet 2. Talk button 4 is normally biased in an upward direction by compression spring 76. A locking notch 77 is formed in the side of rod 73 adjacent its lower or distal end 74. In referring to FIG. 4, it can be seen that when lever 3 is in the OFF position and talk button 4 is depressed, locking notch 77 will be engaged by locking portion 54 of pivot member 50 to keep talk button 4 in its depressed position.

Referring once again to FIG. 2, it will be seen that an E-ring 80 is provided to fit in a ring groove 81 of pivot shaft 24; that a retaining washer 82 is fixed to the distal end of support shaft 38 by welding or the like; that, a set screw 83 is inserted into a screw hole 84 of support shaft 49; and that a retaining washer 85 is fixed to the distal end of support shaft 49 by set screw 83.

In the following description of the operation of transceiver 1, unless noted otherwise, solid lines, single dot-dash lines, and double dots-dash lines of movable parts shown in FIGS. 3 and 5 correspond to the OFF, ON and standby positions, respectively, of lever 3. When lever 3 is in the OFF position, switch 46 is positioned to interrupt a supply of power to each circuit element of transceiver 1 and thus places the transceiver in an inoperative state. If, at a time when lever 3 is disposed in the OFF position, talk button 4 is depressed, locking portion 54 engages locking notch 77 of rod 73 to prevent talk button 4 from returning to its raised position under the urging of spring 76. More specifically, and as most easily seen by referring to FIG. 3, when lever 3 is in its OFF position and then talk button 4 is depressed against the biasing force of compression spring 76, the distal end of rod 73 contacts inclined surface 54a of locking portion 54 such that arm 52 is bent slightly clockwise due to its elasticity. Once distal end 74 of rod 73 moves past arm 52, the elastic reaction of arm 52 causes locking portion 54 to engage in locking notch 77. Thus, talk button 4 is locked in its depressed position for facilitating transportation of transceiver 10. Furthermore, inasmuch as talk button 4 will be locked in its depressed position only when lever 3 is in its OFF position, there can be no confusion by a transceiver operator as to when transceiver 10 is in its inoperative state. In other words, if the talk button 4 is locked after being depressed, that is an indication to the operator that the transceiver is in its inoperative state.

As disclosed heretofore, where it is desired to establish the transmission or receiving mode, rod antenna 5 is pivoted in the direction indicated by arrow d from its stored position through approximately 180° to its extended operative position. Lever 3 is then pivoted clockwise to the ON position. Pivot shaft 24 pivots with lever 3, and slide member 29 is displaced in the direction of arrow e on FIG. 3 to the position indicated by the single dot-dash line. As a result of such movement of slide member 29, actuating arm 47 of switch 46, which is sandwiched between the pair of engaging pawls 44 of slide member 29, causes switch 46 to supply power to a transmission/reception circuit (not shown) and places the transceiver in the receiving mode, assuming talk button 4 is not thereafter depressed.

More particularly, as slide member 29 slides in the direction of arrow e, pivot member 50 pivots clockwise, as viewed on FIG. 3, to a position indicated by the single dot-dash line. If button 4 had been previously locked in its depressed position, portion 54 of pivot member 50 is disengaged from locking notch 77 of the rod 73 resulting in the return of talk button 4 to its original or raised position by the force exerted by compression spring 76. Since portion 61 of second interlocking member 56 is thereby released from the urging force of the distal end of rod 73, and is urged to the position shown in solid lines by arm 65 of transmission/reception switch 64 which returns to its original or extended position resulting in the transmission/reception circuit being switched to the receiving mode. Transmitted signals are then received by the transmission/reception circuit upon setting channel selector knob 12 to the desired position.

In order for the transmission/reception circuit to be changed-over to a transmission mode, talk button 4 is depressed against the biasing force of compression spring 76. The distal end of rod 73 will push against portion 61 of second interlocking member 56 forcing urging portion 63 to push arm 65 into switch 64 and thereby switch the transmission/reception circuit to the transmission mode. Upon completion of transmission, pressure is no longer exerted against talk button 4, resulting in the return of rod 73 to its original position due to the force exerted against it by compression spring 76. Projection 63 no longer urges arm 65 into the body of transmission/reception switch 64 and allows the transmission/reception circuitry to revert back to the receiving mode.

The standby mode is established by pivoting lever 3 to the standby position. Pivot shaft 24 pivots with switch lever 3, and causes slide member 29 to move in the direction indicated by arrow e (FIG. 3) to the position indicated by the double dots-dash line. Switch arm 47 is moved by pawls 44 of slide member 29 to a position indicated by the double dots-dash line. The power source (not shown), is thereby switched by switch 46 from the transmission/reception circuit to the standby circuit for establishing the standby mode. Upon reception of a signal by the transceiver, an alarm, for example, an oscillating sound, is produced by speaker 8. Additionally, in the standby mode, portion 35 of pivot shaft 24 contacts urging portion 40 of first interlocking member 39 and projection 66 of first interlocking member 39 contacts urging portion 62 of second interlocking member 56.

Transceiver 1 is switched from the standby mode to the transmission mode simply by depressing talk button 4. When talk button 4 is depressed against the biasing force of compression spring 76, the distal end of rod 73 is pushed against portion 61 of second interlocking member 56 and thereby pivots second interlocking member 56 in the clockwise direction as seen in FIG. 5. First interlocking member 39 is pivoted counterclockwise due to the action of urging portion 62 of second interlocking member 56 against projection 66. Portion 35 of pivot shaft 24 is then moved clockwise about the shaft axis, as viewed on FIG. 5, due to the action thereagainst of portion 40 of first interlocking member 39. Slide member 29 is moved in a direction opposite to that of arrow e on FIG. 3 causing arm 47 of three-position switch 46 to move from the position indicated by the double dots-dash line to the position indicated by the single dot-dash line. Thus, the power source is switched from connection to the standby circuit to connection to the transmission/reception circuit. Arm 65 is urged by switch urging projection 63 of second interlocking member 56 into the body of transmission/reception switch 64 and thereby establishes the transmission mode of the transmission/reception circuit. Thus, depression of talk button 4 switches both three-position switch 46 and transmission/reception switch 64, so that changeover from the standby mode to the transmission mode can be accomplished in one simple, rapid step.

In order to merely hear the received signal while in the standby mode, lever 3 can be pivoted from the standby position to the ON position assuming talk button 4 is not depressed. Transceiver 1 can also be switched from the standby mode to the receiving mode by temporarily depressing and then immediately releasing talk button 4. This latter method of switching from the standby mode to the receiving mode is particularly advantageous if transceiver 1 must be operated with one hand.

Figure 6:
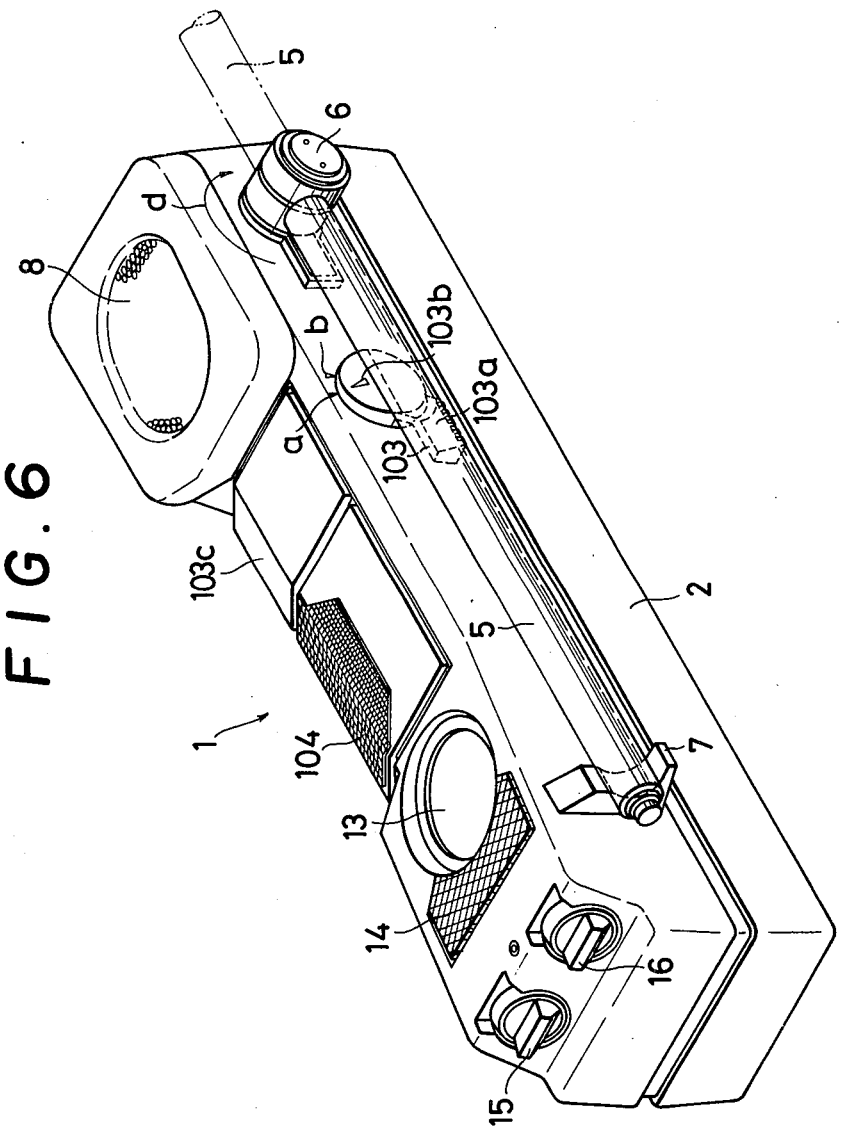
FIG. 6 is a perspective view of a transceiver in accordance with another embodiment of the present invention.
Figure 7:
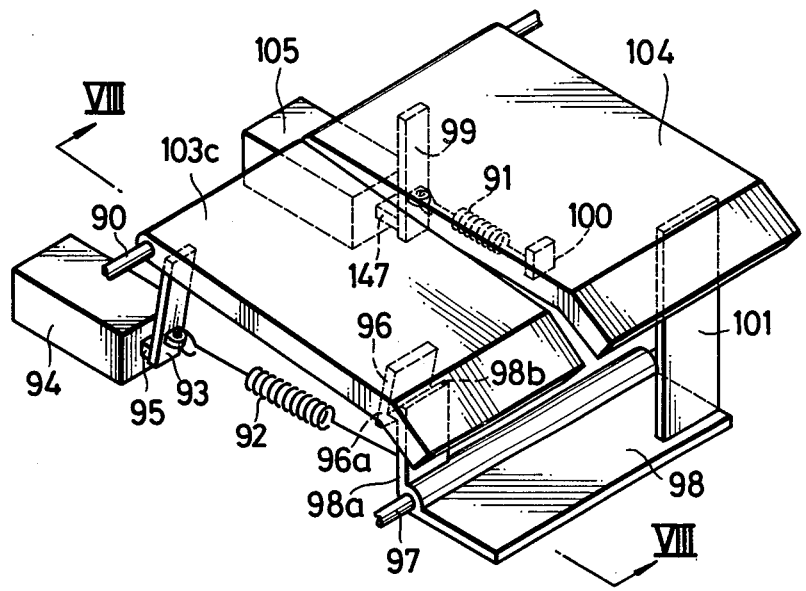
FIG. 7 is a detail perspective view of a portion of the transceiver shown in FIG. 6.
Figure 8:
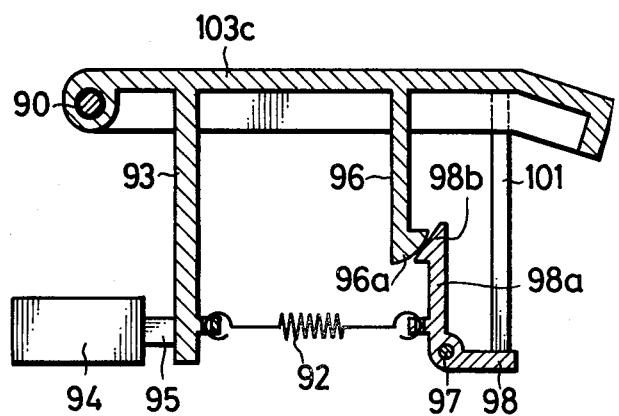
FIG. 8 is a sectional view taken along line VIII—VIII on FIG. 7.

A second embodiment of the invention is illustrated in FIGS. 6–8 in which the parts corresponding to those described with reference to FIGS. 1–5 are identified by the same reference numerals. Scan button 9, frequency display window 10, manual button 11 and channel selector knob 12 of the first embodiment are omitted from the second embodiment for providing a relatively low cost transceiver. A power source control lever 103 replaces lever 3 of FIGS. 1–5 and is a two-position switch lever having an index 103b which, when aligned with marks a and b on cabinet 2, indicates that the power source is OFF and ON respectively. A standby button 103c is arranged next to speaker 8, and a talk button 104 is arranged next to standby button 103c. The power source switch (not shown) is suitably controlled by lever 103, for example, by being mechanically connected thereto, and is arranged separately from a standby switch 94 (FIGS. 7 and 8) which is controlled by standby button 103c. Such separation is in contrast to the first embodiment wherein the functions of connecting to the power source and achieving standby are performed by a single switch, namely, three position slide type switch 46. However, as in the first embodiment, unless antenna 5 is moved from its rest position, power source switch lever 103 cannot be set to mark b corresponding to the ON position. Further, as in the first embodiment, if power source switch lever 103 is set to mark b, at a time when antenna 5 is moved from its operative position for transmitting and receiving to its stored position on antenna rest 7, antenna 5 acts on a contact portion 103a of lever 103 to pivot the latter to mark a corresponding to the inoperative state of the transceiver.

FIGS. 7 and 8 illustrate an interlock mechanism interlinking standby button 103c and talk button 104. Talk button 104 and standby button 103c are supported pivotally about a common pivot shaft 90 and are biased to raised positions by tension springs 91 and 92, respectively.

When standby button 103c is depressed against the biasing force of spring 92, a projecting leg 93 integral therewith urges an actuating arm 95 of standby switch 94 to a depressed or retracted position against the biasing force of a spring located within the body of switch 94. Arm 95 is otherwise normally biased by such internal spring to an extended position substantially projecting from the body of switch 94 for disabling the standby circuit, that is, causing operation of the receiving/transmitting circuit. Thus only when standby button 103c is depressed, is switch 94 actuated to establish the standby mode.

Upon depressing of standby button 103c a locking pawl 96a of a rib 96 integral with standby button 103c is engaged and locked by a locking pawl 98b on a flange 98a integral with a pivoted latching body 98. Thus, through engagement of locking pawls 96a and 98b, standby button 103c remains depressed and locks the transceiver in its standby mode of operation. Latching body 98 is pivotal about a pivot shaft 97 and is biased to a locking or latching position by spring 92 connected between flange 98a and leg 93. The outer side surfaces of locking pawls 96a and 98b are inclined, as shown particularly in FIG. 8, so that such pawls will interengage in response to depressing of button 103c.

In order to change from the standby mode to the transmitting mode of operation, talk button 104 is depressed against the biasing force of spring 91. In the course of the resulting movement of talk button 104, a projection 101 integral with talk button 104 urges latching body 98 to pivot against the biasing force of spring 92 and to release pawl 98b from pawl 96a so that spring 92 can raise standby button 103c. Standby button 103c, when raised, moves its leg 93 away from arm 95 of standby switch 94 so that the connection to the standby circuit is interrupted. As talk button 104 is depressed, a projection 99 integral therewith urges an actuator arm 147 of a transmission/reception switch 105 to press against the biasing force of a spring disposed within the body of switch 105 and thereby changes-over transmission/reception switch 105 from the reception mode to the transmission mode.

When neither talk button 104 nor standby button 103c are depressed and when switch lever 103 is in the ON position, the transceiver of FIGS. 6–8 is in the receiving mode. Under such conditions the biasing force of spring 91, which is connected between projection 99 and an anchor 100 on talk button 104, ensures that projection 99 will not be pressed against arm 147 and the latter will extend from the body of transmission/reception switch 105 for selecting the receiving mode.

Thus, in each described embodiment, switching from the standby mode to the receiving or transmission mode is accomplished substantially instantaneously. Furthermore, and in contrast to the prior art, the present invention provides that substantially no loss of information occurs during the time interval required to switch from the standby mode to the receiving mode.

Having described illustrative embodiments of the invention with reference to the accompanying drawings, it is to be understood that the invention is not limited to such precise embodiments, and that various changes and modifications may be effected therein by one skilled in the art without deparing from the scope and spirit of the invention as defined in the appended claims.

I claim:

1. In a transceiver having transmitting, receiving, and standby modes of operation; an apparatus for selectively establishing said modes of operation including means actuable to establish said standby mode of operation, changeover means and interconnecting means for interconnecting said means actuable to establish said standby mode of operation with said changeover means, wherein said change-over means is effective, when depressed, to cause said interconnecting means to change said transceiver from said standby mode to said transmitting mode or, when depressed and then released, to cause said interconnecting means to change said transceiver from said standby mode to said receiving mode.

2. A transceiver as in claim 1; wherein said interconnecting means comprises interlocking means for mechanically interlocking said means actuable to establish said standby mode of operation with said change-over means.

3. A transceiver as in claim 2; wherein said means actuable to establish said standby mode of operation includes first manually displaceable mode-determining control means having a first position corresponding to said standby mode, a second position for said transmitting and receiving modes, and a third position corresponding to an inoperative state of said transceiver.

4. A transceiver as in claim 3; wherein said first manually displaceable mode-determining means is rotatable to each of said first, second and third positions thereof.

5. A transceiver as in claim 4; wherein said interlocking means includes a first interlocking member, means for rotatably coupling said first interlocking member with said first manually displaceable mode-determining means, and a second interlocking member responsive to depression of said change-over means in said standby mode to causes said first interlocking member to rotate said first manually displaceable mode-determining means from said first position to said second position.

6. A transceiver as in claim 4; wherein said first manually displaceable mode-determining means includes a lever pivotally mounted at an exterior surface of a housing of said transceiver.

7. A transceiver as in claim 6; further comprising an antenna movably mounted on said housing for movement between a stored position against said surface and a projecting operative position, said antenna acting on said lever in response to movement from said operative position to said stored position for disposing said first manually displaceable mode-determining means in said position corresponding to the inoperative state.

8. A transceiver as in claim 7; wherein said antenna prevents manual operation of said lever when said antenna is disposed in said stored position against said surface of the transceiver housing.

9. A transceiver as in claim 2; wherein said means actuable to establish said standby mode include second manually displaceable mode-determining means which is depressible for said standby mode, and third manually displaceable mode-determining means having a first position for establishment of said transmitting and receiving modes and a second position corresponding to an inoperative state of said transceiver.

10. A transceiver as in claim 9; wherein said interlocking means includes a latch member operative to hold said second manually displaceable mode-determining means in a depressed position, and means responsive to depression of said change-over means for releasing said latch member and thereby permitting return of said second manually disposeable mode-determining means from said depressed position.

11. A transceiver as in claim 9; wherein said third manually displaceable mode-determining means is rotatable to each of said positions thereof.

12. A transceiver as in claim 11; wherein said third manually displaceable mode-determining means includes a lever pivotally mounted at an exterior surface of a housing of said transceiver.

13. A transceiver as in claim 12; further comprising an antenna which is movably mounted on said housing for movement between a stored position against said surface and an extended operative position, said antenna acting on said lever in response to movement from said operative position to said stored position for establishing said inoperative state.

14. A transceiver as in claim 13; wherein said antenna prevents manual operation of said lever when said antenna is disposed in said stored position.

15. A transceiver as in claim 2; wherein said means actuable to establish the standby mode is also positionable for establishing an inoperative state; and further comprising means for maintaining said change-over means in a depressed state in response to said means actuable to establish said standby mode being positioned for establishing said inoperative state.

16. A transceiver as in claim 1; wherein said change-over means includes a manually actuable push-button.

* * * * *